US009675919B2

(12) United States Patent
Boger et al.

(10) Patent No.: US 9,675,919 B2
(45) Date of Patent: Jun. 13, 2017

(54) METHOD TO ENHANCE THE ASH STORAGE CAPACITY OF A PARTICULATE FILTER

(75) Inventors: Thorsten Rolf Boger, Painted Post, NY (US); Yunfeng Gu, Painted Post, NY (US); Suhao He, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 669 days.

(21) Appl. No.: 13/213,301

(22) Filed: Aug. 19, 2011

(65) Prior Publication Data

US 2013/0045139 A1     Feb. 21, 2013

(51) Int. Cl.
*F01N 3/029* (2006.01)
*B01D 46/42* (2006.01)

(52) U.S. Cl.
CPC .......... *B01D 46/42* (2013.01); *B01D 2279/30* (2013.01)

(58) Field of Classification Search
CPC ........ F01N 3/023; F01N 3/0232; F01N 3/029; F01N 3/0293; F01N 3/04; F01N 2610/1493; B01D 46/0082; B01D 46/0057; B01D 2273/12
USPC ............ 60/295, 310; 55/385.3, 523; 96/233, 96/228, 281
See application file for complete search history.

(56) References Cited

U.S. PATENT DOCUMENTS

| | | | |
|---|---|---|---|
| 5,189,878 A * | 3/1993 | Robinson et al. | 60/309 |
| 5,698,012 A * | 12/1997 | Yoshikawa | 96/47 |
| 6,773,478 B1 | 8/2004 | Broering et al. | 55/385.3 |
| 7,047,731 B2 | 5/2006 | Foster et al. | 60/297 |
| 7,296,402 B1 | 11/2007 | Cook | 60/295 |
| 7,716,922 B2 | 5/2010 | Ehlers | 60/295 |
| 7,767,031 B2 | 8/2010 | Thomas et al. | 134/166 R |
| 2006/0266023 A1* | 11/2006 | Boegner et al. | 60/297 |
| 2008/0314021 A1 | 12/2008 | Sisken | 60/274 |
| 2009/0020136 A1 | 1/2009 | Katinas et al. | 134/1 |
| 2010/0031640 A1* | 2/2010 | Ohashi | 60/286 |
| 2010/0126145 A1 | 5/2010 | He et al. | 60/286 |

FOREIGN PATENT DOCUMENTS

| | | | | |
|---|---|---|---|---|
| EP | 1181966 A1 * | 2/2002 | | B01D 46/24 |
| JP | 58180713 A * | 10/1983 | | F01N 3/02 |
| WO | 2005/020365 | 4/2005 | | B01D 46/00 |

OTHER PUBLICATIONS

Machine translation of EP 1181966 A1, accessed on Jun. 29, 2015.*
Machine translation of EP 1181966 A1, accessed on Dec. 12, 2015.*
"Improved Lifetime Pressure Drop Management for Robust Cordierite (RC) Filters With Asymmetric Cell Technology (ACT)", Krishna Aravelli and Achim Heibel; 2007-01-0920; SAE Technical Paper Series; Diesel Exhaust Emission Control, 2007; SAE International.

(Continued)

*Primary Examiner* — Jonathan Matthias
(74) *Attorney, Agent, or Firm* — Joseph M. Homa; Erica Livingstone

(57) ABSTRACT

A method of treating a particulate filter includes introducing a work fluid, such as water, into one or more channels of the filter and then removing the work fluid in a vaporized state. The channels contain an amount of ash and the density of the ash is greater subsequent to the removal of the work fluid than prior to the introduction of the work fluid.

25 Claims, 5 Drawing Sheets

(56) References Cited

OTHER PUBLICATIONS

"Thermal Durability of Wall-Flow Ceramic Diesel Particulate Filters"; Merkel et al; 2001-01-0190; SAE Technical Paper Series; Diesel Exhaust Emission Control; SAE International.
CRT Filter; Dieselnet Technology Fuide; Diesel Filter Systems; dieslenet.com; 2005; 17 Pages.
Sappok; "As Accumulation in Diesel Particulate Filters"; Dieselnet Technology Guide; 2013; 34 Pages.

* cited by examiner

METHOD TO ENHANCE THE ASH STORAGE CAPACITY OF A PARTICULATE FILTER

BACKGROUND

The disclosure relates generally to methods of improving the performance of particulate filters and particularly to methods of enhancing the ash storage capacity of particulate filters.

Particulate filters are an essential component of modern diesel after-treatment systems and may see increased application in gasoline after-treatment systems. Commonly used wall-flow filters operate with a combination of depth filtration and surface filtration, the former being primarily performed by the filter wall material and the latter by a layer of soot and ash particulates deposited onto the filter wall during operation. The ash particles originate from inorganic components in the fuel and lubricant oil. In contrast to soot particles, ash particles do not burn during filter regeneration and accumulate over time, forming an ash wall layer as well as channel plug ash. This leads to a gradually increasing pressure drop across the filter and a penalty in fuel efficiency. At a certain point, the filter pressure drop exceeds an acceptable range.

A variety of methods have been proposed to remove ash from filters. Many of such methods require periodic maintenance in a service station using specifically designed ash cleaning apparatuses. Such methods include mechanical vibration, reversed air pulsing, gravity force, or acoustic wave. Methods of removing ash from filters in-situ (i.e., while the filter is on engine) are less common. One proposed method involves thermally sintering the ash at temperatures ranging from 700-1000° C. However, this method suffers from drawbacks, which include the sintered ash being more difficult to remove, the high temperature required introduces a fuel penalty, and the exposure of the filter and any catalyst(s) to high temperatures, raising concerns relating to ash interaction with filter materials, filter thermal-mechanical robustness, and catalyst deactivation.

SUMMARY

One embodiment of the disclosure relates to a method of treating a particulate filter. The method includes introducing a work fluid into at least one channel of the particulate filter, the channel comprising an amount of ash. The method also includes removing the work fluid from the at least one channel in a vaporized state. The density of the ash is greater subsequent to the removal of the work fluid than prior to the introduction of the work fluid.

Another embodiment of the disclosure relates to a system including an injector to inject a work fluid into at least one channel of a particulate filter, the channel comprising an amount of ash. The work fluid is removed from the at least one channel in a vaporized state. The density of the ash is greater subsequent to the removal of the work fluid than prior to the introduction of the work fluid.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments of the disclosure will be described in detail with reference to the drawings, if any.

As used herein, when a boiling point is stated, it is understood that the boiling point is at one atmosphere pressure (101,325 Pa), unless specifically stated otherwise.

As used herein, the term "cold start" refers to the time when an internal combustion engine is started after not being operated for at least two hours or when the engine temperature immediately prior to being started is at or below 50° C.

A fluid captured from a coolant system associated with operation of an internal combustion engine can include any fluid generated or present in conjunction with coolant system associated with operation of an internal combustion engine, such as an engine coolant system or an air conditioning system, including, but not limited to liquid water condensate.

Figure 1:
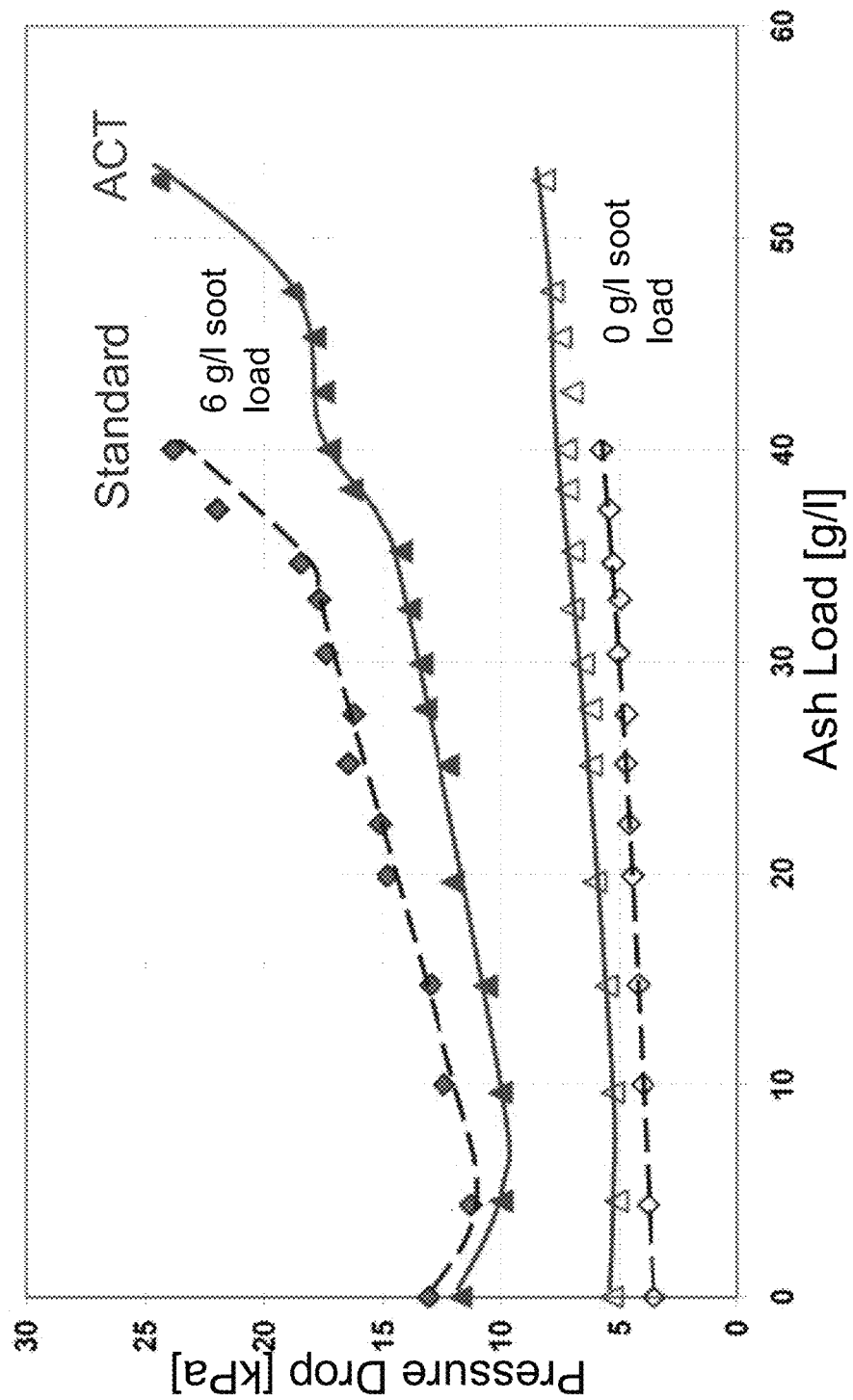
FIG. 1 plots pressure drop as a function of cumulate ash level for wall flow particulate filters having two different cross-sectional cell geometry patters.

Particulate filters, such as wall flow particulate filters, are very efficient at trapping soot particles emitted by combustion engines. As part of the combustion process, not only soot particles but also some ash particles are emitted. These inorganic particles commonly originate from additives and impurities present in the fuel and lubricants used. In general, these particles are also trapped with high efficiency by particulate filters. However, as compared to soot, which may be removed through oxidation, these ash particles remain inside the inlet channels of the filter, typically forming a layer on the filter wall and an "ash plug" at the outlet side of the inlet channels. As they continue to build up as a result of engine operation, the available volume and filtration surface area of the filter inlet channels gradually diminishes. Consequently, the pressure drop of the filter gradually increases over use. FIG. 1 plots pressure drop as a function of ash load for wall flow particulate filters having two different cross-sectional cell geometry patters (asymmetric cell technology and standard cell design), at loaded (6 grams per liter soot load) and clean (0 grams per liter soot load) conditions. High pressure drop at high ash load can result in the need to replace the filter or to remove the ash externally via an ash cleaning or removal process.

Applicants have discovered that while correlations are often made between pressure drop and cumulate ash collected (i.e., the mass of ash present), pressure drop is actually more a result of the volume of the ash present in the filter. Typically, ash deposits that accumulate in particulate filters are packed very loose with relatively high void fractions (85-95%) such that ash packing densities are in the range of about 150-400 grams per liter. A significant increase in packing density (or reduction in ash volume) can be achieved if these loose materials are packed tighter. Applicants have discovered that such increase in density can be achieved through introduction of a work fluid, such as water, to the particulate filter, followed by evaporation of the work fluid such that the ash deposits agglomerate.

Such methods can extend the useful life of a particulate filter and can be used in situ (with the filter in use and on engine) or during regular maintenance. The methods can be used in a wide variety of filter applications, including those on diesel and gasoline powered engines. In addition, the methods can be particularly advantages for systems with SCR catalyst integrated onto the particulate filter, wherein on board hardware for fluid injection already exists. The methods can also be particularly advantageous for heavy duty and non-road applications where high mileage is required. The methods may also be advantageous with gasoline particulate filters, which may be designed to relatively small volumes. In addition, the methods may be particularly advantageous in any application where typical filter temperatures do not lead to significant sintering of the ash.

In embodiments disclosed herein, the particulate filter can be along an exhaust flow path of an internal combustion engine and the work fluid can be introduced as a liquid (i.e., at temperatures below its boiling point) into one or more channels of the particulate filter. An example of a work fluid is water. Other examples of work fluids include water soluble organic liquids, such as alcohols and amides, especially those having boiling points of less than 200° C., including boiling points between 50° C. and 200° C., and further including boiling points between 75° C. and 150° C. The work fluid may also include other water soluble components.

Work fluids other than water or additives can include those that are soluble in water and can be mixed with water in various ratios such that an aqueous solution is obtained having up to 100% of a water soluble solute or additive, including up to 50% of a water soluble solute or additive, and further including up to 10% of a water soluble solute or additive.

Work fluids can also include those having a surface tension of at least 30 mN/m at 20° C., such as a surface tension of at least 40 mN/m at 20° C., and further such as a surface tension of at least 50 mN/m at 20° C., including those having a surface tension of between 40 mN/m at 20° C. and 100 mN/m at 20° C.

In certain embodiments, the work fluid is introduced at temperatures below its boiling point, such as temperatures at least 10° C. below its boiling point, and further such as temperatures at least 25° C. below its boiling point, and yet further such as temperatures at least 50° C. below its boiling point.

In certain embodiments, the work fluid is introduced at work fluid temperatures between the work fluid's freezing point and boiling point, such as between 5° C. above the freezing point and 5° C. below the boiling point of the work fluid, and further such as between 10° C. above the freezing point and 10° C. below the boiling point of the work fluid.

In certain embodiments, the work fluid is first introduced only at times when the average filter temperature is below a predetermined temperature, such as when the average filter temperature is below (or predicted to be below) the boiling point of the work fluid, including such as when the average filter temperature is 5° C. below (or predicted to be below) the boiling point of the work fluid, and further such as when the average filter temperature is 10° C. below (or predicted to be below) the boiling point of the work fluid.

In certain embodiments, the work fluid is first introduced only at times when the engine exhaust temperature is below a predetermined temperature, such as when the engine exhaust temperature is below (or predicted to be below) 200° C., including such as when the engine temperature is below (or predicted to be below) 150° C., and further including when the engine exhaust temperature is below (or predicted to be below) 100° C.

In certain embodiments, the work fluid may be substantially introduced as a vapor which condenses into a liquid upon contact with the ash. The work fluid may also be introduced as a liquid spray, including a liquid spray of fine droplets that can be effectively carried in a gas flow stream.

The work fluid may be introduced in a pressurized or unpressurized state. When introduced in a pressurized state, such as a pressurized liquid spray, the pressure may be any pressure from slightly above ambient (e.g., 0.1 psig) to 200 psig, such as from 1 psig to 150 psig and further such as from 10 to 100 psig.

The work fluid may be introduced to the filter in at least one of a variety of introduction schemes. For example, the work fluid may be introduced to the filter following cold start of the internal combustion engine, such as and before engine exhaust temperature reaches the boiling point of the work fluid, and further such as before exhaust temperature reaches 5° C. below the boiling point of the work fluid, and yet further such as before exhaust temperature reaches 10° C. below the boiling point of the work fluid.

The work fluid may also be introduced at regularly scheduled intervals, such as intervals based on time, mileage, or any other scheme based on the estimated or actual amount of ash in the filter at a given time.

For example, in mobile emissions and other applications, the work fluid may be introduced after every cold start of the engine, after every other cold start of the engine, after every third cold start of the engine and so forth.

Alternatively, in mobile emissions and other applications, the work fluid may be introduced so many times per day, week, month or year, such as, for example, 1 to 10 times per day, 1 to 50 times per week, 1 to 200 times per month, and 1 to 2,000 times per year.

In mobile emissions applications, the work fluid may be introduced at certain predetermined mileage intervals, such as at least once every 10 miles, at least once every 100 miles, at least once every 1,000 miles, at least once every 10,000 miles and so forth.

The work fluid may also be introduced when the vehicle or engine is undergoing scheduled maintenance. Such introductions can still occur in-situ.

The work fluid may be introduced based on the incremental (or estimated incremental) amount of ash accumulation in the filter since the previous work fluid introduction. The mass ratio of the work fluid introduced to the ash incrementally added to the filter since the previous work fluid introduction can be at least 0.3 to 1, such as at least 0.4 to 1, and further such as at least 0.5 to 1.

The work fluid may be introduced based on the filter pore volume (or estimated pore volume). The volume ratio of the work fluid introduced to the pore volume of the filter can be at least 3 to 1, such as at least 4 to 1, and further such as at least 5 to 1.

The total injection time and/or total injection flow rate can be adjusted such that an appropriate amount of work fluid is introduced to the filter under a given set of circumstances. Total injection time can, for example, range from about 1 second to about 15 minutes, such as from about 2 seconds to about 12 minutes, and further such as from about 5 seconds to about 10 minutes.

Total injection flow rate can, for example, range from about 1 mL/min to about 20 L/min, such as from about 2 mL/min to about 15 L/min, and further such as from about 5 mL/min to about 10 L/min.

The work fluid is removed from the filter in a vaporized state. For example, in certain embodiments, evaporation can be induced as a result of heat transfer between the filter and/or the exhaust gas and the work fluid, such as when the temperature of the filter and/or the exhaust gas exceeds the boiling point of the work fluid. As work fluid is removed, the temperature of the filter and/or the exhaust gas may exceed the boiling point of the work fluid by at least 5° C., such as at least 10° C., and further such as at least 20° C.

Subsequent to removal of the work fluid, the density of the ash is greater than the density of the ash prior to the introduction of the work fluid. For example, in certain embodiments, the density of the ash subsequent to the removal of the work fluid is at least 5% higher, such as at least 10% higher, and further such as at least 20% higher, and still further such as at least 50% higher and yet still further such as at least 100% higher the density of the ash prior to the introduction of the work fluid.

Subsequent to removal of the work fluid, the ash plug length in the end of the inlet channels is less than the ash plug length prior to the introduction of the work fluid. For example, in certain embodiments, the ash plug length subsequent to the injection of the work fluid is less than ¾, such as less than ⅔, and further such as less than ½ the ash plug length prior to the introduction of the work fluid.

The work fluid can be provided by one or more of a number of different means or methods. For example, the work fluid may be provided from a dedicated work fluid storage reservoir. The work fluid may also be provided from one or more fluid sources typically present on a mobile, internal combustion engine. For example, the work fluid may be captured from at least one of a coolant system and an exhaust fluid associated with operation of an internal combustion engine. When captured from an exhaust fluid, the work fluid may be condensed from a vapor in the exhaust fluid into a liquid through use of a condenser or heat exchanger.

In certain embodiments, a system including the filter may also include an injector to inject the work fluid into at least one channel of the filter. The injector may, for example, be placed upstream (relative to the direction of exhaust fluid flow) from the filter.

The system may also include a source for a reducing agent (such as urea water solution) for selective catalytic reduction (SCR) when, for example, the filter includes an integrated SCR catalyst. At least one of the work fluid and the reducing agent may be injected into at least one channel of the filter through the injector.

A valve, such as a three-way valve may also be placed between the reducing agent and work fluid sources so as to enable selectively injecting the reducing agent and/or the work fluid at different times. For example, during cold start and up to exhaust fluid temperatures of about 150 to 180° C., reducing agents used for SCR are typically not injected (for example, when urea water solution is used as a reducing agent, ammonium nitrate can form, solid urea can deposit, and incomplete evaporation can occur during this time). Accordingly, during the time between cold start and when this exhaust fluid temperature level is reached, an existing reducing agent injector can be used to introduce the work fluid into the exhaust and filter and the valve can be configured to allow the work fluid to flow into the injector. At other times, the valve can allow for the reducing agent to flow into the injector.

Figure 2A:
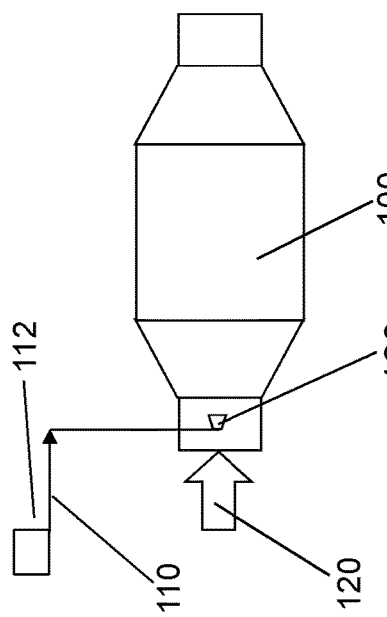
FIGS. 2A-2C schematically illustrate examples of system configurations according to embodiments disclosed herein.

FIG. 2A schematically illustrates an example of an embodiment wherein a work fluid 110 can be introduced to an exhaust flow 120 and the filter 100 from a work fluid source 112 and through an injector 130.

Figure 2B:
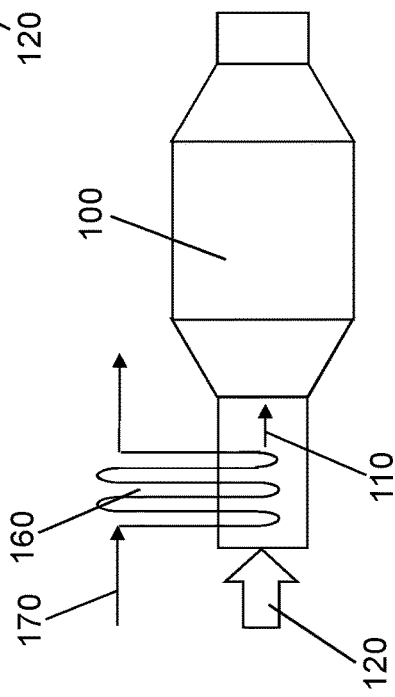

FIG. 2B schematically illustrates an example of an embodiment wherein a three-way valve 140 is configured to allow for a reducing agent 150 or a work fluid 110 to be introduced to the exhaust flow 120 and the filter 100 through an injector.

Figure 2C:
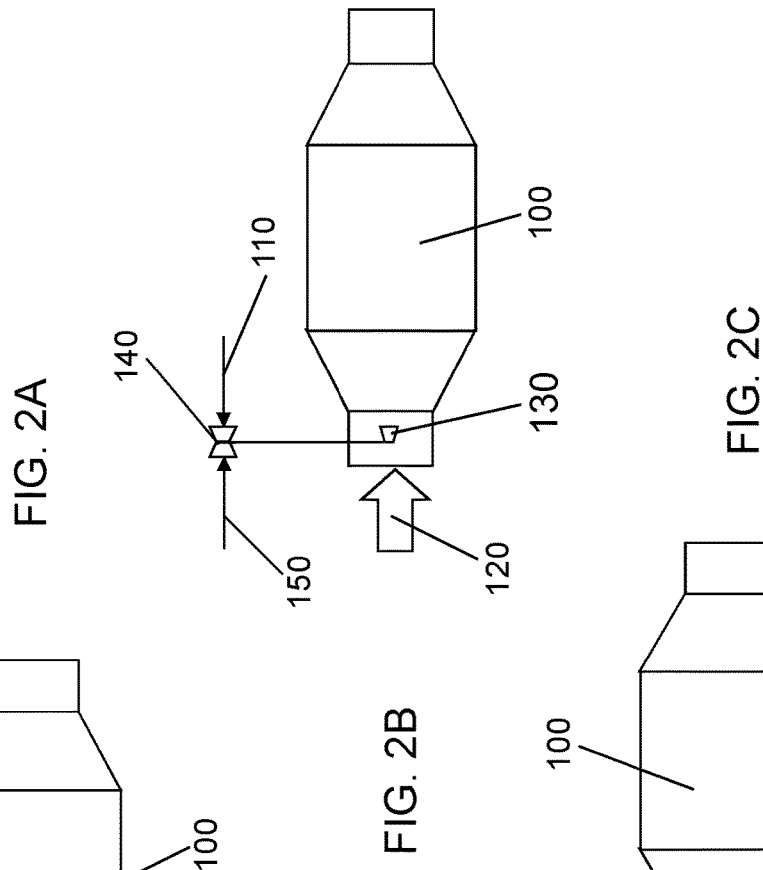

FIG. 2C schematically illustrates an example of an embodiment wherein, prior to being introduced to the filter 100, the work fluid 110 is condensed from vapor present in the exhaust flow 120 through use of a heat exchanger 160 and coolant 170.

The disclosure and scope of the appended claims will be further clarified by the following examples.

EXAMPLES

Example 1: Laboratory Experiment

A bench scale laboratory experiment was conducted in which ash was added to a sample container, sprayed with water, heated to a target temperature, kept at the target temperature for a predetermined amount of time, cooled to room temperature, and then weighed. An ash layer was first added to a container. Then liquid water was sprayed on the ash layer. Afterwards another ash layer was added and then liquid water sprayed until about 1 g of total weight was achieved. The weight percentage of liquid in the ash-liquid mixture was as indicated in Table 1. Then the sample was heated in an oven at a heating rate of 5° C. per minute until the temperature reached the target temperature indicated in Table 1. Each sample was kept at its respective target temperature for 5 hours. Subsequently, each sample was cooled to room temperature following which the density of each sample was determined. The change in density of the sample from the beginning of each experimental run to the end of each experimental run was also determined. The results are set forth in Table 1. As can be seen, as the samples are dosed with increasing amounts of water the resulting density of the ash increases.

TABLE 1

| Sample No. | Water in mixture (%) | Target temperature (° C.) | Density (g/l) | Change in density (%) |
|---|---|---|---|---|
| 1 | 27 | 700 | 479 | −2.5 |
| 2 | 41 | 700 | 572 | +16.4 |
| 3 | 25 | 300 | 491 | −2.7 |
| 4 | 46 | 300 | 605 | +19.8 |

Example 2: Test Cell Experiment

An test cell experiment was conducted on full-sized aluminum titanate filters, each having a diameter of about 5.66 inches, a length of about 6 inches, about 300 cells per square inch of frontal area, and a wall thickness of about 10 mils. For a pressure drop test, filters were loaded with soot. At differing soot loads, ranging from 0 grams of soot per liter of filter volume to 5 grams of soot per liter of filter volume, the pressure drop across each filter was measured.

Next, the filters were incrementally loaded with ash using a method based on a burner, which is capable of simulating the ash deposition observed on an engine. The burner is operated with diesel fuel and lubricant oil is added to the combustion to increase the output of inorganic ash. The ash generated by this method has been found to be comparable to ash found in filters operated on diesel engines.

Figure 3:
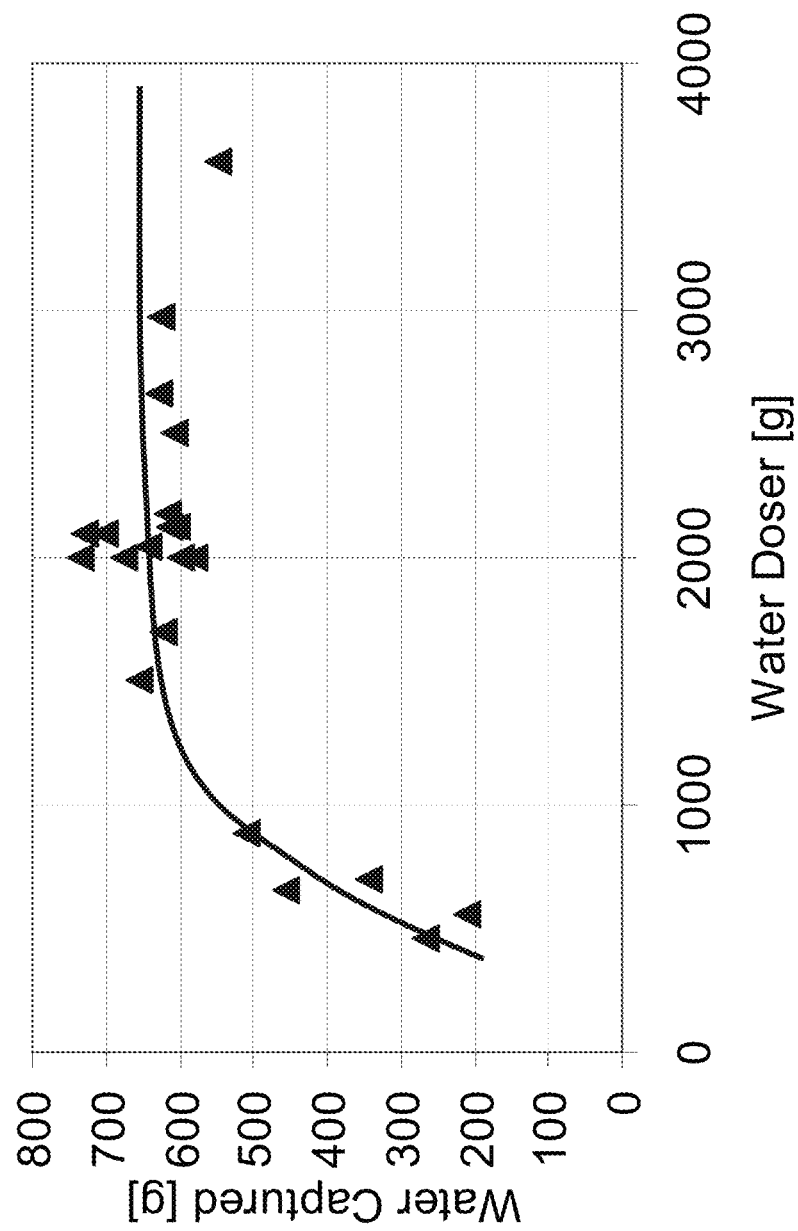
FIG. 3 plots the results of a water saturation experiment.

For every 2.5 grams of ash per liter of filter volume that was loaded, samples representing methods as disclosed herein were sprayed with water at a pressure of about 15-20 psig and at a temperature of about 40° C. by means of a nozzle with a 0.030 inch hole. The samples were sprayed with at least about 100 grams of water for each gram of ash load increase, which was determined to be at or near the water saturation point, as determined by a water saturation experiment (shown in FIG. 3). Each filter was then held at the water spray temperature for 30 minutes, heated up to 300° C. for 15 minutes, and then to 600° C. for an additional 15 minutes.

Figure 4:
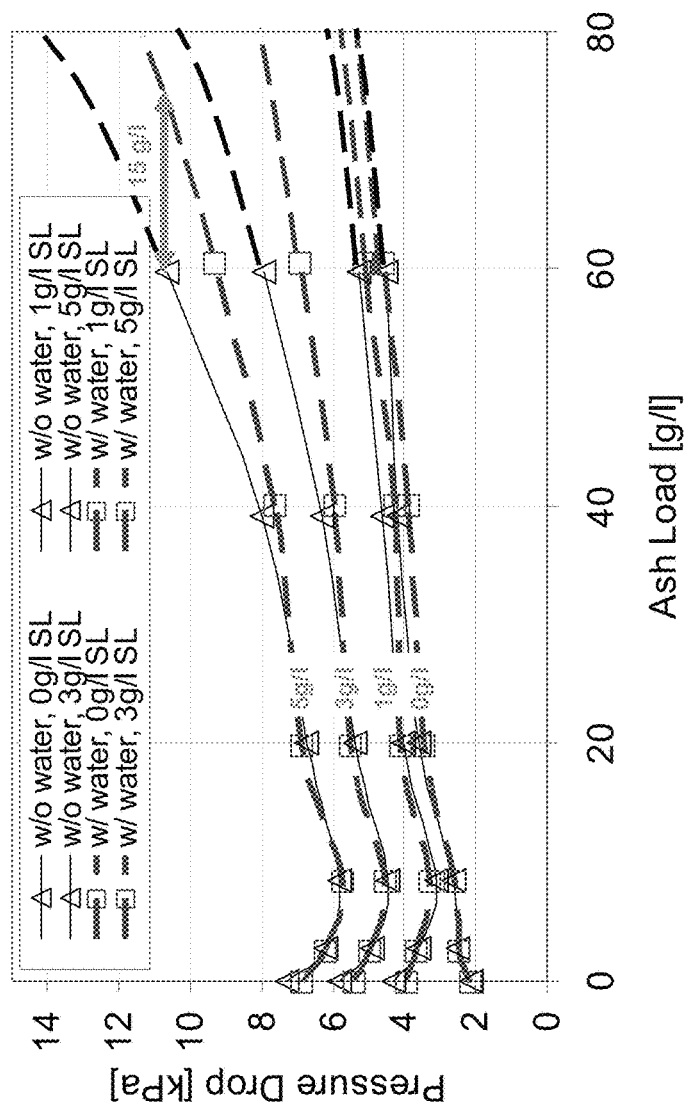
FIG. 4 plots pressure drop as a function of ash load for filters under different experimental conditions.

Comparative samples, which were not dosed with water, were also incrementally loaded with ash. For both samples representing methods as disclosed herein as well as comparative samples, the pressure drop tests were run for ash loadings of 0, 2.5, 7.5, 20, 40, and 60 grams of ash per liter of filter volume. Results are plotted in FIG. 4. As can be seen, samples representing methods as disclosed herein and comparative samples each had approximately the same initial pressure drop when no ash was present. However, at increasing amounts of ash (and soot) loadings, the pressure drop of samples representing methods disclosed herein exhibited significantly lower increases in pressure drop than did comparative samples. This can, in turn, enable significantly extended filter operation life.

Figure 5:
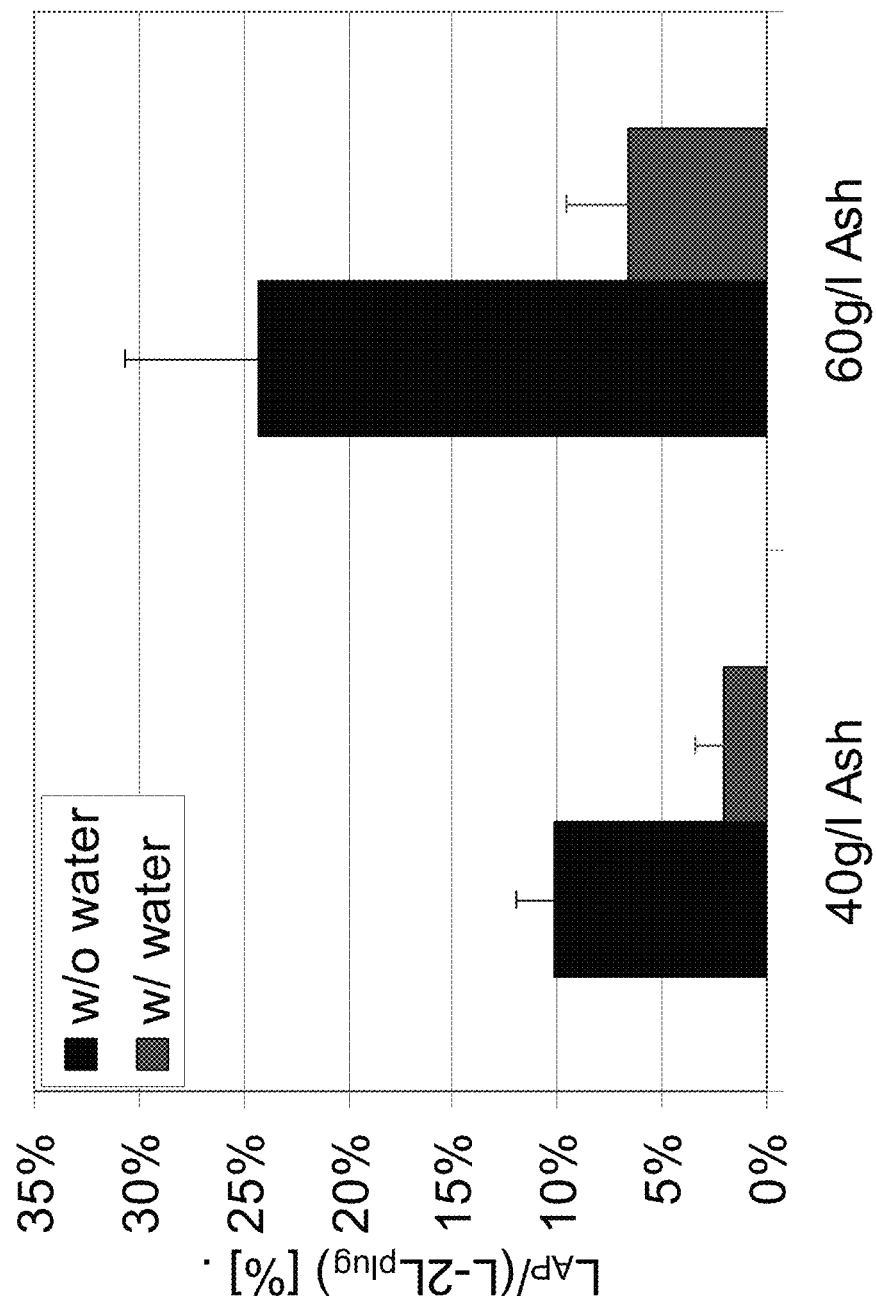
FIG. 5 shows ash plug fill-up ratios for filters under different experimental conditions.

The filter samples involved in the experiment set forth in Example 2 were also analyzed for the lengths of ash plugs inside the inlet channels (i.e., ash that accumulates adjacent to inlet channel plugs) using a boroscope measurement technique. Boro scope measurements were taken for both samples representing methods disclosed herein as well as comparative samples at ash loadings of 40 grams of ash per liter of filter volume and at 60 grams of ash per liter of filter volume. For each of these samples, an "ash plug fill-up ratio" was calculated, which was calculated as the value of $L_{AP}/(L-2L_{plug})$, wherein $L_{AP}$ is the measured ash plug length, L is the total filter length, and $L_{plug}$ is the channel plug length. Results are plotted in FIG. 5. As can be seen, the ash plug fill-up ratio was reduced by more than 70% in samples corresponding to methods disclosed herein relative to comparative samples. Reduced ash plug fill-up ratio (corresponding to reduced ash plug length) enables extended filter operation life, as ash plug length is the primary driver accounting for second order pressure drop increase at high ash load.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of treating a particulate filter comprising channels, the method comprising:
   introducing a work fluid into the channels of the particulate filter, wherein at least 2.5 g/l of ash is disposed in the form of ash plugs in one or more ash-loaded inlet channels prior to the introduction of the work fluid, wherein the ash plugs are packed by contact with the work fluid, and wherein a density of ash in the ash plugs after contact with the work fluid is greater than a density of ash in the respective ash plugs prior to contact with the work fluid;
   holding the work fluid in the channels of the particulate filter at a target temperature below a boiling point of the work fluid for a predetermined time period; and
   vaporizing the work fluid to remove the fluid from the channels,
   wherein the ash plugs remain in the channels after the work fluid is removed.

2. The method of claim 1, wherein the work fluid comprises at least one component selected from the group consisting of water, water soluble organic liquids, an aqueous solution having a water-soluble solute, and an aqueous solution having a water-soluble additive.

3. The method of claim 1, wherein the work fluid has a boiling point of less than 200° C. and the work fluid is introduced at a temperature below its boiling point.

4. The method of claim 1, wherein the work fluid is introduced as a vapor and condenses upon contact with the ash.

5. The method of claim 1, wherein the work fluid is introduced as a liquid spray.

6. The method of claim 1, wherein the particulate filter is operably disposed along an exhaust flow path of the internal combustion engine.

7. The method of claim 6, wherein the work fluid is introduced into the at least one channel after cold start of the internal combustion engine and before engine exhaust temperature reaches the boiling point of the work fluid.

8. The method of claim 6, wherein the work fluid is introduced when an average filter temperature is below the boiling point of the work fluid.

9. The method of claim 1, wherein a mass ratio of the work fluid introduced to the ash incrementally added to the particulate filter since a previous work fluid introduction is at least 0.3 to 1.

10. The method of claim 1, wherein the particulate filter has a pore volume, and wherein a volume ratio of the introduced work fluid to the pore volume of the particulate filter is at least 3 to 1.

11. The method of claim 1, wherein the work fluid is introduced at a pressure of from 0.1 to 200 psig.

12. The method of claim 1, wherein the density of the ash subsequent to the removal of the work fluid is at least 5% higher than the density of the ash prior to the introduction of the work fluid.

13. The method of claim 1, further comprising oxidizing soot trapped in the at least one channel in a regeneration to produce at least a portion of the ash.

14. The method of claim 1, wherein the at least one channel comprises a soot loading of greater than 1 g/l when the captured work fluid is introduced into the at least one channel.

15. The method of claim 14, wherein the soot loading of the at least one channel is no greater than 5 g/l when the captured work fluid is introduced into the at least one channel.

16. The method of claim 1, wherein the work fluid is captured from at least one of a coolant system and exhaust fluid associated with operation of an internal combustion engine.

17. The method of claim 16, wherein the capturing of the work fluid comprises condensing the work fluid from a vapor in the exhaust fluid prior to the introduction of the work fluid into the at least one channel of the particulate filter.

18. The method of claim 1, wherein the predetermined time period ranges from 30 minutes to 5 hours.

19. A method of treating a particulate filter, the method comprising:
introducing a work fluid into at least one channel of the particulate filter, wherein the work fluid is introduced at a temperature below a boiling point of the work fluid;
contacting the work fluid with ash in the at least one channel of the particulate filter,
holding the work fluid in the at least one channel of the particulate filter at a target temperature below the boiling point of the work fluid for a predetermined time period; and
vaporizing the work fluid to remove the fluid from the at least one channel,
wherein the ash has an initial density prior to contact with the work fluid that is lower than a final density after contact with the work fluid; and
wherein the ash remains in the at least one channel after the work fluid is removed.

20. A method of treating a particulate filter having at least one channel in which an ash deposit having an ash plug length is present, the method comprising:
agglomerating the ash deposit by introducing an amount of work fluid into the at least one channel sufficient to increase the density of the ash deposit while reducing the ash plug length; and
vaporizing the work fluid to remove the work fluid from the ash deposit;
wherein the ash deposit with increased density and reduced ash plug length remains in the channel after the work fluid is removed.

21. The method of claim 20, wherein the amount of work fluid injected is adjusted by selecting a total injection time for the injection of the work fluid.

22. The method of claim 21, wherein the total injection time ranges from about 1 second to about 15 minutes.

23. The method of claim 21, wherein the amount of work fluid injected is adjusted by selecting a total injection flow rate for the injection of the work fluid.

24. The method of claim 23, wherein the total injection flow rate ranges from about 1 mL/min to about 20 mL/min.

25. The method of claim 20, wherein the work fluid is introduced at a temperature below a boiling point of the work fluid.

* * * * *